United States Patent
Funai et al.

(10) Patent No.: US 12,202,459 B2
(45) Date of Patent: Jan. 21, 2025

(54) VEHICLE CONTROL APPARATUS AND VEHICLE CONTROL SYSTEM

(71) Applicant: Hitachi Astemo, Ltd., Hitachinaka (JP)

(72) Inventors: Hirokazu Funai, Hitachinaka (JP); Jun Kubo, Hitachinaka (JP); Takahiro Hata, Hitachinaka (JP); Katsuhiko Wakabayashi, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 745 days.

(21) Appl. No.: 17/282,666

(22) PCT Filed: Oct. 1, 2019

(86) PCT No.: PCT/JP2019/038688
§ 371 (c)(1),
(2) Date: Apr. 2, 2021

(87) PCT Pub. No.: WO2020/071345
PCT Pub. Date: Apr. 9, 2020

(65) Prior Publication Data
US 2021/0339723 A1    Nov. 4, 2021

(30) Foreign Application Priority Data

Oct. 3, 2018  (JP) ................. 2018-188450

(51) Int. Cl.
*B60T 8/32*   (2006.01)
*B60T 8/172*  (2006.01)

(52) U.S. Cl.
CPC ............. *B60T 8/329* (2013.01); *B60T 8/172* (2013.01)

(58) Field of Classification Search
CPC .... B60T 8/329; B60T 8/171; B60T 2270/413; B60T 2270/604; B60T 13/588; B60T 17/22; B60T 1/10; B60T 8/94; B60T 8/96; B60T 8/172; F16D 61/00
See application file for complete search history.

(56) References Cited

U.S. PATENT DOCUMENTS

2016/0096434 A1   4/2016  Nakaoka et al.
2016/0325719 A1   11/2016 Linhoff et al.

FOREIGN PATENT DOCUMENTS

| JP | 2018-16161     | * | 2/2018  | ............. B60T 17/18 |
|----|----------------|---|---------|--------------------------|
| JP | 2018-16161 A   |   | 2/2018  |                          |
| KR | 20130058156 A  | * | 6/2013  | ............. B60T 17/18 |
| WO | WO 2014/188516 A1 |   | 11/2014 |                       |

OTHER PUBLICATIONS

Wikipedia page "Bus (computing)", accessed from www.archive.org Oct. 2, 2018 (Year: 2018).*
Wikipedia page "Antilock braking system" accessed from www.archive.org Apr. 27, 2017 (Year: 2017).*
Machine translation of JP2018016161, downloaded from Espacenet Sep. 12, 2023 (Year: 2023).*

(Continued)

*Primary Examiner* — Peter D Nolan
*Assistant Examiner* — Tanya C Sienko
(74) *Attorney, Agent, or Firm* — Crowell & Moring LLP

(57) ABSTRACT

A vehicle control apparatus includes a first ECU electrically connected to a wheel speed sensor and a second ECU electrically connected to the wheel speed sensor.

16 Claims, 9 Drawing Sheets

(56) References Cited

OTHER PUBLICATIONS

Machine translation of KR-20130058156-A downloaded off IP.com Apr. 4, 2024 (Year: 2024).*
International Search Report (PCT/ISA/210) issued in PCT Application No. PCT/JP2019/038688 dated Nov. 26, 2019 with English translation (five (5) pages).
Japanese-language Written Opinion (PCT/ISA/237) issued in PCT Application No. PCT/JP2019/038688 dated Nov. 26, 2019 with English translation (14 pages).

* cited by examiner

VEHICLE CONTROL APPARATUS AND VEHICLE CONTROL SYSTEM

TECHNICAL FIELD

The present invention relates to a vehicle control apparatus and a vehicle control system.

BACKGROUND ART

PTL 1 discloses a vehicle control apparatus including a first brake control device connected to a first wheel speed sensor via a wiring and a second brake control device connected to a second wheel speed sensor via a wiring in a vehicle equipped with two wheel speed sensors for one wheel.

CITATION LIST

Patent Literature

PTL 1: United States Patent Application Publication No. 2016/0325719

SUMMARY OF INVENTION

Technical Problem

However, the above-described conventional technique requires two wheel speed sensors per wheel, thereby raising a possibility of leading to a reduction in layout flexibility and an increase in cost.

Solution to Problem

One of objects of the present invention is to provide a vehicle control apparatus and a vehicle control system capable of avoiding a reduction in layout flexibility and an increase in cost when a redundant arrangement is provided for wheel speed detection.

According to one aspect of the present invention, in a vehicle control apparatus, a first braking instruction portion and a second braking instruction portion are each electrically connected to the same wheel speed sensor.

Advantageous Effects of Invention

Therefore, according to the one aspect of the present invention, it is possible to avoid the reduction in layout flexibility and the increase in cost when the redundant arrangement is provided for the wheel speed detection.

DESCRIPTION OF EMBODIMENTS

Figure 1:
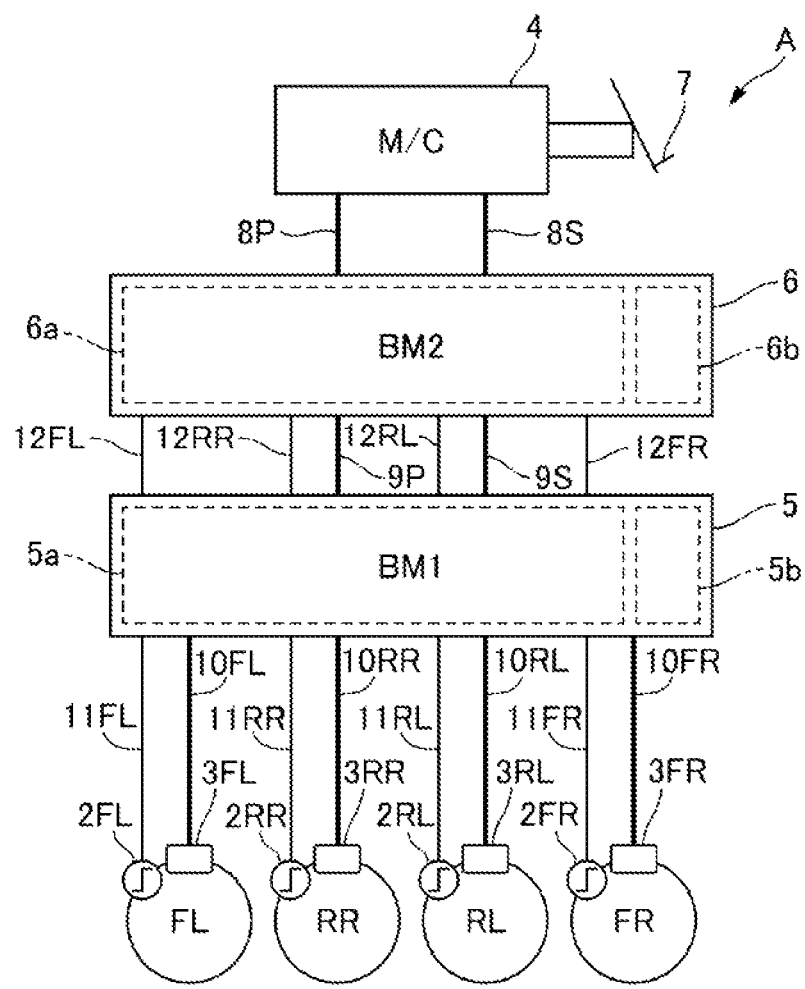
FIG. 1 illustrates the configuration of a vehicle control system A according to a first embodiment.

[First Embodiment] FIG. 1 illustrates the configuration of a vehicle control system A according to a first embodiment.

The vehicle control system A is, for example, a brake control system mounted on an electric vehicle. The vehicle control system A includes wheel speed sensors 2, wheel cylinders (braking force application portions) 3, a master cylinder 4, a first brake module (a first braking function portion) 5, and a second brake module (a second braking function portion) 6. In each portion illustrated in FIG. 1, P placed at the end of the reference numeral indicates that this portion corresponds to a primary system (a P system) of the master cylinder 4. S placed at the end of the reference numeral indicates that this portion corresponds to a secondary system (an S system) of the master cylinder 4. Hereinafter, when the P and S systems are not distinguished from each other, the indexes P and S will be omitted. Further, FL placed at the end of the reference numeral indicates that this portion corresponds to a front left wheel FL. FR placed at the end of the reference numeral indicates that this portion corresponds to a front right wheel FR. RL placed at the end of the reference numeral indicates that this portion corresponds to a rear left wheel RL. RR placed at the end of the reference numeral indicates that this portion corresponds to a rear right wheel RR. When these wheels FL to RR are not distinguished from one another, the indexes FL, FR, RL, and RR will be omitted.

The wheel speed sensors 2 are mounted on the respective wheels, and each detect the rotational speed of the wheel (a wheel speed) and output an electric signal (for example, a sinusoidal or square-wave pulse signal that changes a current or a voltage, a communication signal in compliance with an IC communication protocol such as SENT and SPI, or a communication signal based on, for example, a communication protocol for an in-vehicle apparatus such as CAN and Flex Ray) according to the wheel speed. The vehicle control system A can use sensors generally employed at present by employing the wheel speed sensors that output the pulse signal. The vehicle control system A can reduce a noise influence generated in a transmission route (a wiring) by employing the wheel speed sensors that output the communication signal in compliance with the communication protocol between ICs or the communication protocol for an in-vehicle apparatus.

The wheel cylinders 3 each apply a braking force to the wheel by pressing brake pads provided on the vehicle body side in correspondence with the wheel against a brake disk provided on the wheel side according to a supplied brake hydraulic pressure (a wheel cylinder hydraulic pressure).

The master cylinder 4 generates a brake hydraulic pressure (a master cylinder hydraulic pressure) by being actuated according to an operation performed on a brake pedal 7 by a driver (a brake operation).

The first brake module 5 and the second brake module 6 are provided between the master cylinder 4 and the wheel cylinders 3. The first brake module 5 includes a first hydraulic pressure unit (a first braking force control portion) 5a and a first electronic control unit (corresponding to a first braking instruction portion and a first control portion, and hereinafter will be referred to as a first ECU) 5b. The first hydraulic pressure unit 5a includes a plurality of actuators (a motor pump and a plurality of electromagnetic valves), and can feed brake fluid to the wheel cylinders 3 independently of the driver's brake operation. The first ECU 5b controls the actuation of the first hydraulic pressure unit 5a.

The second brake module 6 includes a second hydraulic pressure unit (a second braking force control portion) 6a and a second electronic control unit (corresponding to a second braking instruction portion and a second control portion, and hereinafter will be referred to as a second ECU) 6b. The second hydraulic pressure unit 6a includes a plurality of actuators (a motor pump and a plurality of electromagnetic valves), and can feed brake fluid to the wheel cylinders 3 independently of the driver's brake operation. The second ECU 6b controls the actuation of the second hydraulic pressure unit 6a.

The master cylinder 4 and the second hydraulic pressure unit 6a are connected via a first primary pipe 8P and a first secondary pipe 8S therebetween. The first primary pipe 8P is connected to a primary hydraulic pressure chamber of the master cylinder 4. The first secondary pipe 8S is connected to a secondary hydraulic pressure chamber of the master cylinder 4. The second hydraulic pressure unit 6a and the first hydraulic pressure unit 5a are connected via a second primary pipe 9P and a second secondary pipe 9S therebetween. The first hydraulic pressure unit 5a and the wheel cylinders 3 are connected via wheel cylinder pipes 10 therebetween. The wheel cylinder pipes 10FL and 10RR are connected to the first primary pipe 9P, and the wheel cylinder pipes 10FR and 10RL are connected to the first secondary pipe 9S. In other words, the X-split pipe configuration is employed as the brake piping in the first embodiment.

The wheel speed sensors 2 and the first ECU 5b are electrically connected via first wirings 11 therebetween. The first ECU 5b performs information processing according to a built-in program based on the respective wheel speeds of the wheels FL to RR detected by the wheel speed sensors 2, the stroke of the brake pedal 7, and the like, thereby determining target wheel cylinders of the wheel cylinders 3. The first ECU 5b outputs an instruction signal to each of the actuators in the first hydraulic pressure unit 5a in such a manner that the wheel cylinder hydraulic pressures match the target wheel cylinder hydraulic pressures. As a result, the vehicle control system A can realize anti-skid brake control, electronic stability control, boosting control, autonomous brake control, regenerative cooperative brake control, and the like. The anti-skid brake control reduces occurrence of a skid due to a wheel lock. The electronic stability control stabilizes the posture when the automobile is turning. The boosting control assists the driver's brake operation. The autonomous brake control is, for example, autonomous brake and autonomous emergency brake during autonomous driving. The regenerative cooperative brake control controls the wheel cylinder hydraulic pressures so as to achieve a target deceleration in cooperation with the regenerative brake.

The wheel speed sensors 2 and the second ECU 6b are electrically connected via parts of the first wirings 11 and second wirings 12 therebetween. The second ECU 6b performs information processing according to a built-in program based on the respective wheel speeds of the wheels FL to RR detected by the wheel speed sensors 2, the stroke of the brake pedal 7, and the like, thereby determining the target wheel cylinders of the wheel cylinders 3, when a failure has occurred in the first hydraulic pressure unit 5a. The second ECU 6b outputs an instruction signal (a braking instruction) to each of the actuators in the second hydraulic pressure unit 6a in such a manner that the wheel cylinder hydraulic pressures match the target wheel cylinder hydraulic pressures. As a result, the vehicle control system A can continue the various kinds of brake control even when a failure has occurred in the actuators of the first hydraulic pressure unit 5a and the first ECU 5b.

Figure 2:
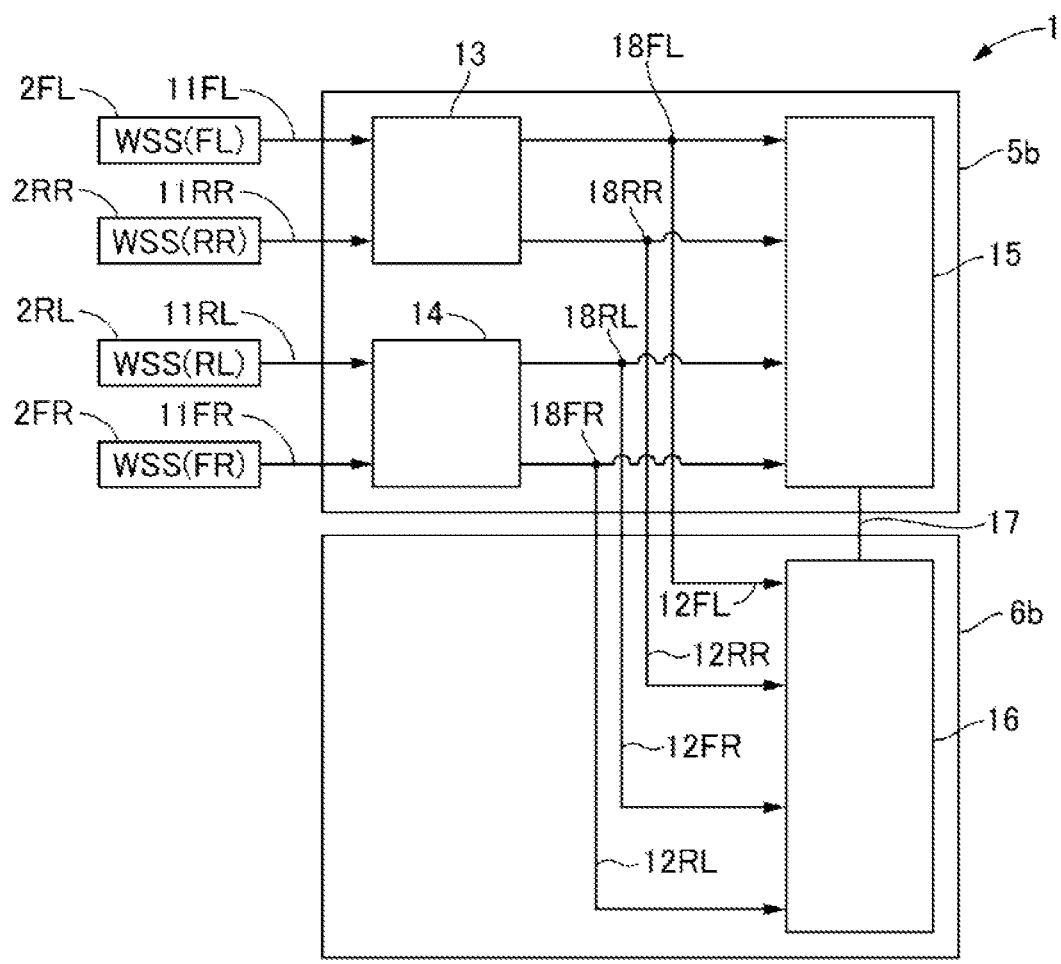
FIG. 2 illustrates the configuration of a vehicle control apparatus 1 according to the first embodiment.

FIG. 2 illustrates the configuration of a vehicle control apparatus 1 according to the first embodiment.

The first ECU 5b includes a first signal processing portion 13, a second signal processing portion 14, and a first calculation portion 15.

The first signal processing portion 13 is provided in the first wirings 11FL and 11RR. The first signal processing portion 13 processes the detection signals of the wheel speed sensor 2FL on the front left wheel and the wheel speed sensor 2RR on the rear right wheel to convert them into signals that can be input by the first calculation portion 15, which is a microcomputer, and a second calculation portion 16, which will be described below. For example, in a case where the wheel speed sensor signal is the sinusoidal or square-wave pulse signal that changes a current or a voltage, the detection signal is converted into a digital signal of a voltage level that can be input by the first calculation portion 15 or a digital signal based on the protocol for communication between ICs such as SENT and SPI. Alternatively, in a case where the wheel speed sensor signal is the digital signal based on the protocol for communication between ICs such as SENT and SPI, the digital signal is encoded according to this protocol.

The second signal processing portion 14 is provided in the first wirings 11RL and 11FR. The second signal processing portion 14 processes the detection signals of the wheel speed sensor 2FR on the front right wheel and the wheel speed sensor 2RL on the rear left wheel to convert them into signals that can be input by the first calculation portion 15 and the second calculation portion 16.

The first calculation portion 15 inputs the respective signals processed by the first signal processing portion 13 and the second signal processing portion 14 as the input signals thereto, calculates the respective wheel speeds of the wheels FL to RR based on the input signals, and outputs the instruction signal to each of the actuators in the first hydraulic pressure unit 5a according to the respective calculated wheel speeds, the stroke of the brake pedal 7, and the like.

The second ECU 6b includes the second calculation portion 16. The second calculation portion 16 is connected to the first calculation portion 15 via a communication line (for example, a CAN) 17 between microcomputers. The first ECU 5b and the second ECU 6b exchange information with each other via the communication line (for example, the CAN) 17 between microcomputers, and mutually monitors occurrence of a failure and the like. The second calculation portion 16 is connected to the first signal processing portion 13 and the second signal processing portion 14 via the parts of the first wirings 11 and the second wirings 12. The second wirings 12 are connected to the first wirings 11 at positions between the first signal processing portion 13 and the second signal processing portion 14, and the first calculation portion 15 (signal flow split points 18FL, 18RR, 18RL, and 18FR). The first wirings 11 and the second wirings 12 are branch wirings that branch at the signal flow split points 18.

The second calculation portion 16 inputs the respective signals processed by the first signal processing portion 13 and the second signal processing portion 14 as the input signals thereto, calculates the respective wheel speeds of the wheels FL to RR based on the input signals, and outputs the instruction signal to each of the actuators in the second hydraulic pressure unit 6a according to the respective calculated wheel speeds, the stroke of the brake pedal 7, and the like, when a failure has occurred in the first hydraulic pressure unit 5a.

Next, the functions and advantageous effects of the first embodiment will be described.

Autonomous driving vehicles should generate a required deceleration for a predetermined time even when a failure has occurred in the brake control system. Further, desirably, the autonomous driving vehicles detect the respective rotational speeds of the wheels and control them with appropriate braking forces to avoid the deterioration of the vehicle behavior due to a wheel lock. To address such a requirement, in the conventional brake control system, a redundant arrangement is provided for the wheel speed detection by mounting two wheel speed sensors per wheel. However, mounting two wheel speed sensors per wheel raises concerns of a reduction in layout flexibility and an increase in cost because of an increase in the number of wheel speed sensors compared to when no redundant arrangement is provided for the wheel speed detection.

Under these circumstances, the vehicle control apparatus 1 according to the first embodiment includes the first ECU 5b electrically connected to the wheel speed sensors 2 and the second ECU 6b electrically connected to the wheel speed sensors 2. This configuration can achieve a redundant arrangement for the wheel speed detection only by adding wirings, thereby eliminating the necessity of the redundancy of the wheel speed sensors and a change in the specifications of the existing brake control system. Therefore, the vehicle control apparatus 1 can avoid the reduction in layout flexibility and the increase in cost when a redundant arrangement is provided for the wheel speed detection.

The vehicle control apparatus 1 includes the first brake module 5 including the first ECU 5b and the second brake module 6 including the second ECU 6b. Due to this configuration, when a failure has occurred in one of the ECUs, the vehicle control apparatus 1 can acquire the wheel speeds with use of the other normal ECU to continue the brake control. Further, because the first ECU 5b and the second ECU 6b are disposed in different brake modules, the vehicle control apparatus 1 can reduce a risk that a failure has occurred in each of both the ECUs 5b and 6b at the same time.

The first ECU 5b and the wheel speed sensors 2 are connected via the first wirings 11, and the second ECU 6b and the wheel speed sensors 2 are connected via the parts of the first wirings 11 and the second wirings 12. Due to this configuration, the vehicle control apparatus 1 can achieve the stabilization of the communication compared to when the wheel speed sensors 2 and both the ECUs 5b and 6b communicate with each other via a wireless signal.

The first hydraulic pressure unit 5a is disposed in the first brake module 5, and the second hydraulic pressure unit 6a is disposed in the second brake module 6. In other words, because the first hydraulic pressure unit 5a and the second hydraulic pressure unit 6a are disposed in different brake modules, the brake control apparatus 1 can reduce the risk that a failure has occurred in each of both the hydraulic pressure units 5a and 6a at the same time.

The detection signals of the wheel speed sensors 2FL and 2RR processed by the first signal processing portion 13 are input to the first ECU 5b via the first wirings 11FL and 11RR, and are input to the second ECU 6b via the parts of the first wirings 11FL and 11RR and the second wirings 12FL and 12RR. Further, the detection signals of the wheel speed sensors 2RL and 2FR processed by the second signal processing portion 14 are input to the first ECU 5b via the first wirings 11RL and 11FR, and are input to the second ECU 6b via the parts of the first wirings 11RL and 11FR and the second wirings 12RL and 12FR. It is rare that a failure has occurred in each of both the signal processing portions 13 and 14 at the same time, and therefore the vehicle control apparatus 1 can be prevented from becoming unable to acquire the wheel speeds of all of the wheels by dividing the signal processing portion into two portions. Then, even when a failure has occurred in one of the signal processing portions, the vehicle control apparatus 1 can acquire the wheel speeds of two wheels from the other normal signal processing portion.

In the vehicle control apparatus 1, the first signal processing portion 13 and the second signal processing portion 14 are disposed in the first ECU 5b. Due to this configuration, the structure of the second ECU 6b can be simplified.

[Second Embodiment] A second embodiment has a basic configuration similar to the first embodiment, and therefore will be described focusing only on differences from the first embodiment.

Figure 3:
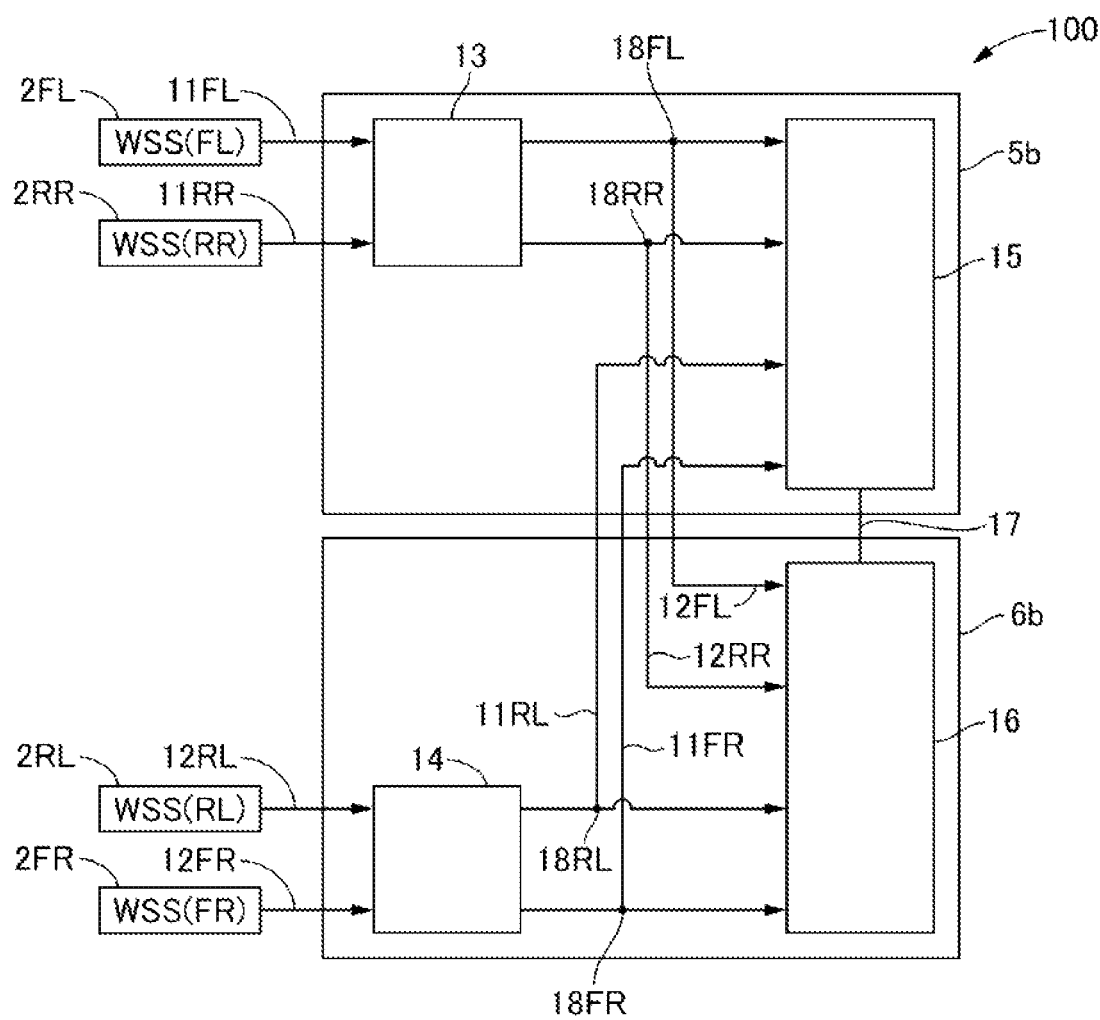
FIG. 3 illustrates the configuration of a vehicle control apparatus 100 according to a second embodiment.

FIG. 3 illustrates the configuration of a vehicle control apparatus 100 according to the second embodiment.

The vehicle control apparatus 100 is different from the vehicle control apparatus 1 according to the first embodiment in terms of the fact that the second signal processing portion 14 is disposed in the second ECU 6b. The wheel speed sensors 2RL and 2FR and the second calculation portion 16 are electrically connected via the second wirings 12RL and 12FR therebetween. The first wirings 11RL and 11FR are connected to the second wirings 12RL and 12FR at positions between the second signal processing portion 14 and the second calculation portion 16 (the signal flow split points 18RL and 18FR).

In the vehicle control apparatus 100 according to the second embodiment, the first signal processing portion 13 is disposed in the first ECU 5b, and the second signal processing portion 14 is disposed in the second ECU 6b. In other words, because the first signal processing portion 13 and the second signal processing portion 14 are disposed in different ECUs, the vehicle control apparatus 100 can reduce a risk that a failure has occurred in each of both the signal processing portions 13 and 14 at the same time.

[Third Embodiment] A third embodiment has a basic configuration similar to the first embodiment, and therefore will be described focusing only on differences from the first embodiment.

Figure 4:
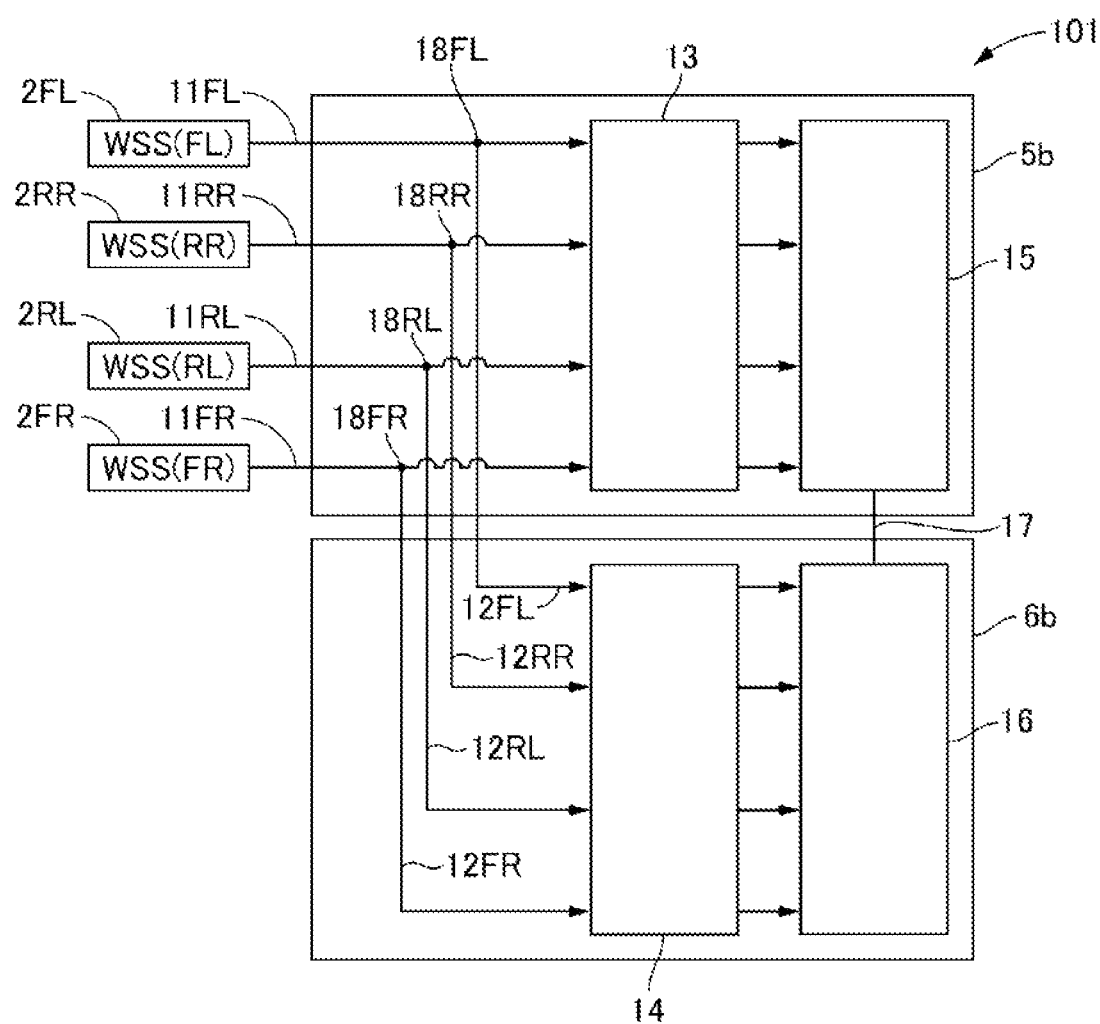
FIG. 4 illustrates the configuration of a vehicle control apparatus 101 according to a third embodiment.

FIG. 4 illustrates the configuration of a brake control apparatus 101 according to the third embodiment.

In the vehicle control apparatus 101, the second signal processing portion 14 is disposed in the second ECU 6b. The second wirings 12 are connected to the first wirings 11 at positions between the wheel speed sensors 2 and the first signal processing portion 13 (the signal flow split points 18FL, 18RR, 18RL, and 18FR).

In the vehicle control apparatus 101 according to the third embodiment, each of the first signal processing portion 13 and the second signal processing portion 14 processes the detection signals of all of the wheel speed sensors 2FL, 2RR, 2RL, and 2FR. Due to this configuration, even when a failure has occurred in any function in one of the ECUs, the other normal ECU can acquire the wheel speeds of all of the wheels.

[Fourth Embodiment] A fourth embodiment has a basic configuration basically similar to the third embodiment, and therefore will be described focusing only on differences from the third embodiment.

Figure 5:
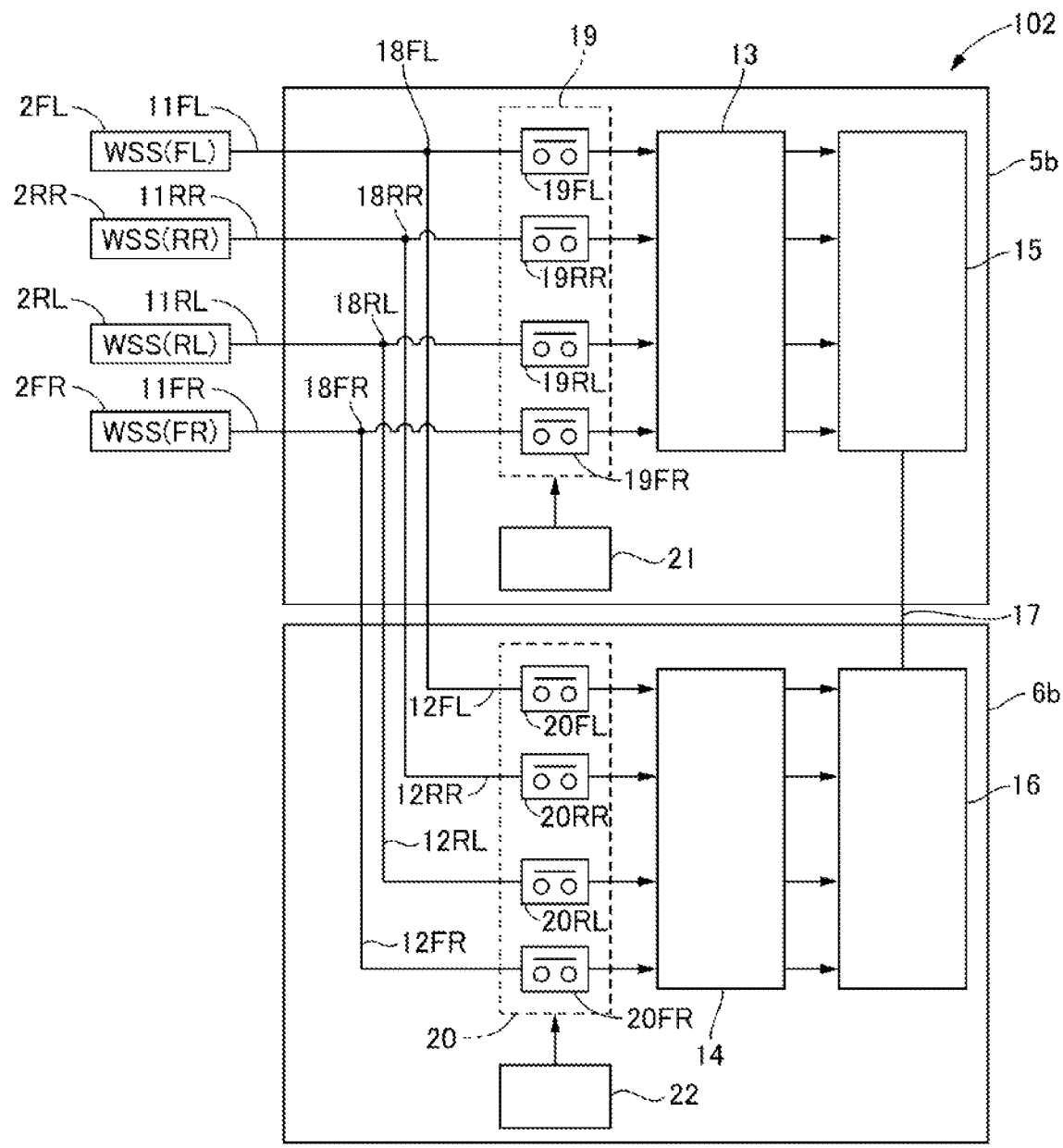
FIG. 5 illustrates the configuration of a vehicle control apparatus 102 according to a fourth embodiment.

FIG. 5 illustrates the configuration of a brake control apparatus 102 according to the fourth embodiment.

The vehicle control apparatus 102 is different from the vehicle control apparatus 101 according to the third embodiment in terms of the provision of first selectors 19 and second selectors 20. The first selectors 19 are disposed at positions in the first wirings 11 that are located on the first signal processing portion 13 side with respect to the signal flow split points 18 between the wheel speed sensors 2 and the first signal processing portion 13. The first selectors 19 energize (hereinafter referred to as "turn on") or block (hereinafter referred to as "turn off") the detection signals according to an instruction from a first selector switching portion 21. The second selectors 20 are disposed between the wheel speed sensors 2 and the second signal processing portion 14. The second selectors 20 energize or block the detection signals according to an instruction from a second selector switching portion 22.

The first selector switching portion 21 turns on the first selectors 19 when all of the individual functions of the first ECU 5b (the first signal processing portion 13 and the first calculation portion 15) operate normally, and turns off the first selectors 19 when a failure has occurred in any of the functions. The second selector switching portion 22 turns off the second selectors 20 when all of the individual functions of the first ECU 5b operate normally, and turns on the second selectors 20 when a failure has occurred in any of the functions. In other words, the second selectors 20 are turned off when the first selectors 19 are turned on, and are turned on when the first selectors 19 are turned off.

The vehicle control apparatus 102 according to the fourth embodiment includes the first selectors 19 and the second selectors 20. Due to this configuration, the wheel speed sensors 2 can be embodied only by providing one sensor according to the specifications generally employed at present (outputs the pulse signal that changes a current) for each of the wheels FL to RR, and, further, ICs according to the specifications generally used for brake control systems at present can also be used for both the signal processing portions 13 and 14. In other words, the provision of the selectors 19 and 20 for switching the acquisition timing eliminates the necessity of changes in the specifications of the wheel speed sensors 2 and the number thereof and further the specifications of the ICs used for both the signal processing portions 13 and 14 from the existing specifications, thereby avoiding the increase in cost.

Now, hypothetically supposing that the above-described wheel speed sensors according to the generally employed specifications are used without the provision of the selectors, this configuration would be accompanied by a reduction in the current value since after the signal flow slit points. This case would raise the necessity of changes in the specifications of the wheel speed sensors or the ICs for the signal processing portions or the like that receive the detection signals thereof from the existing specifications, or increasing the number of wheel speed sensors to two on each of the wheels like PTL 1. On the other hand, the above-described reduction in the current value can be avoided by providing the selectors and control the selectors in such a manner that the detection signals are constantly input to one signal processing portion like the fourth embodiment. As a result, the vehicle control apparatus 102 eliminates the necessity of changes in the specifications of the wheel speed sensors 2 and the number thereof and further the specifications of the ICs used for both the signal processing portions 13 and 14 from the existing specifications, thereby avoiding the increase in cost.

The first selectors 19 are disposed in the first ECU 5b and the second selectors 20 are disposed in the second ECU 6b. In other words, because the first selectors 19 and the second selectors 20 are disposed in different ECUs, the vehicle control apparatus 102 can reduce a risk that a failure has occurred in each of both the selectors 19 and 20 at the same time.

[Fifth Embodiment] A fifth embodiment has a basic configuration similar to the fourth embodiment, and therefore will be described focusing only on differences from the fourth embodiment.

Figure 6:
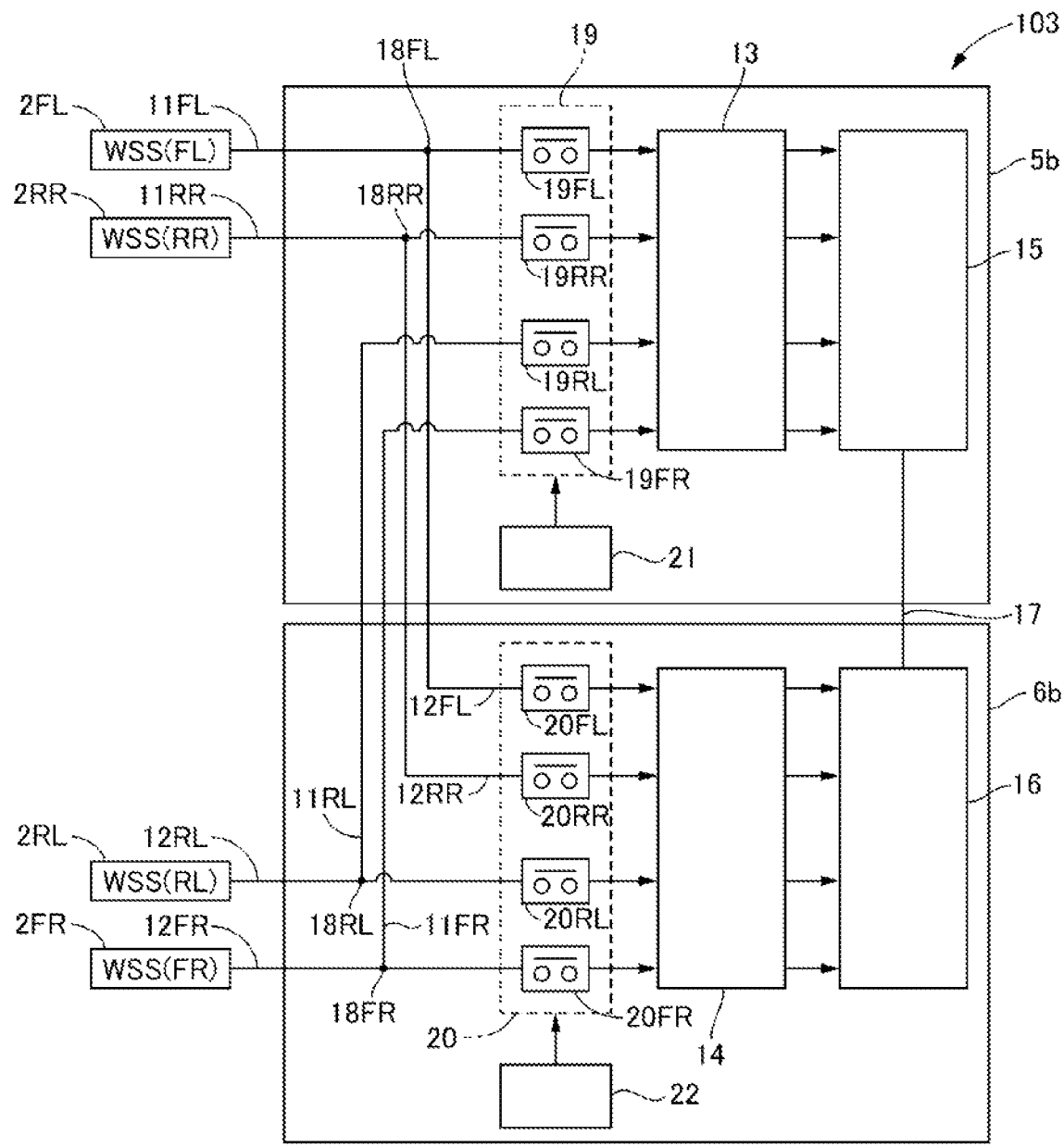
FIG. 6 illustrates the configuration of a vehicle control apparatus 103 according to a fifth embodiment.

FIG. 6 illustrates the configuration of a brake control apparatus 103 according to the fifth embodiment.

The vehicle control apparatus 103 is different from the vehicle control apparatus 102 according to the fourth embodiment in terms of the fact that the detection signals of the wheel speed sensors 2RL and 2FR are input to the second ECU 6b. The first wirings 11RL and 11FR are connected to the second wirings 12RL and 12FR at positions between the wheel speed sensors 2RL and 2FR and the second selectors 20 (the signal flow split points 18RL and 18FR).

The detection signals of the wheel speed sensors 2FL and 2RR are input to the first ECU 5b via the first wirings 11FL and 11RR, and are input to the second ECU 6b via the parts of the first wirings 11FL and 11RR and the second wirings 12FL and 12RR. Further, the detection signals of the wheel speed sensors 2RL and 2FR processed by the second signal processing portion 14 are input to the first ECU 5b via the first wirings 11RL and 11FR, and are input to the second ECU 6b via the parts of the first wirings 11RL and 11FR and the second wirings 12RL and 12FR. Due to this configuration, even when a failure has occurred in one of the signal processing portions, the vehicle control apparatus 103 can acquire the wheel speeds of two wheels from the other normal signal processing portion.

[Sixth Embodiment] A sixth embodiment has a basic configuration similar to the fourth embodiment, and therefore will be described focusing only on differences from the fourth embodiment.

Figure 7:
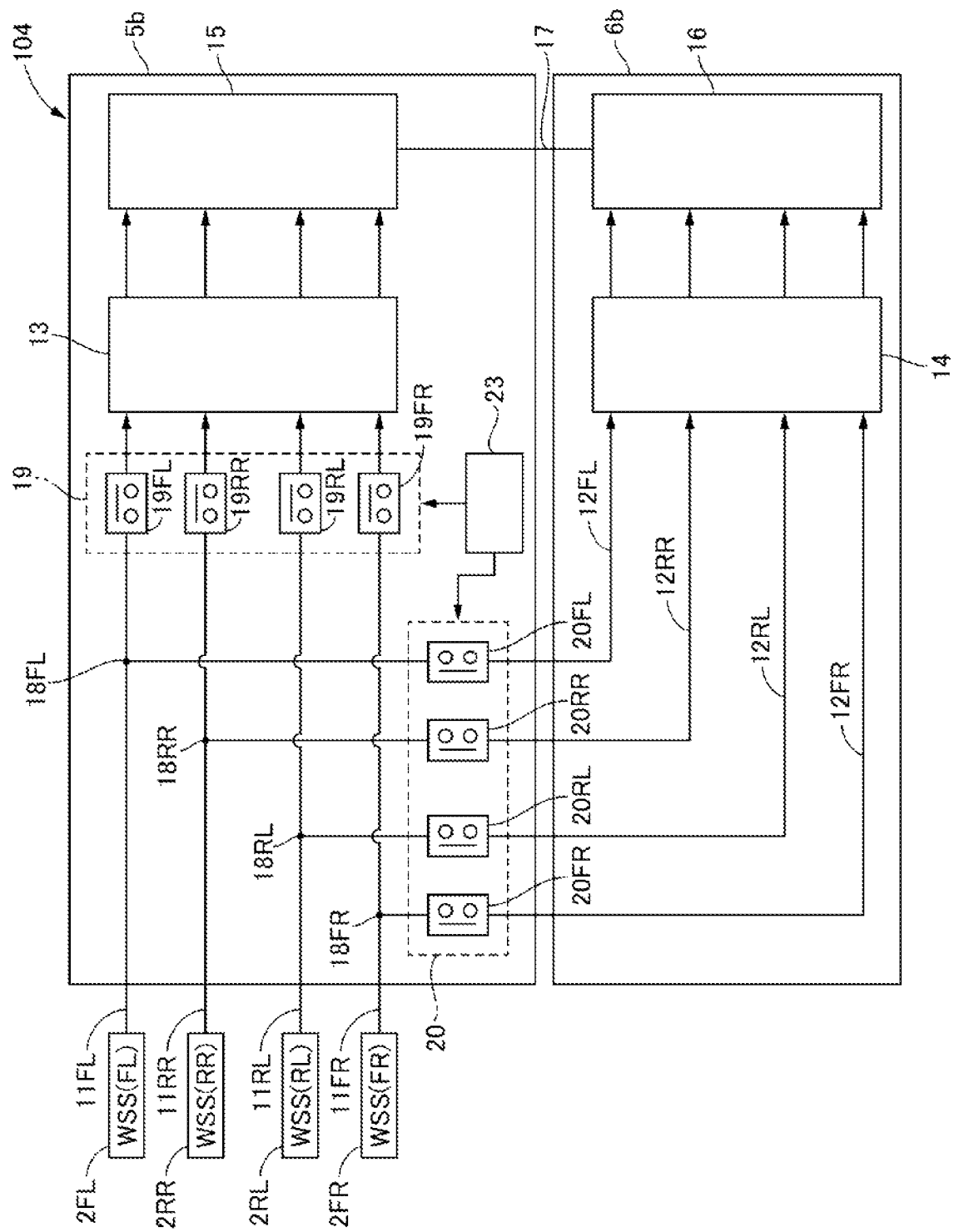
FIG. 7 illustrates the configuration of a vehicle control apparatus 104 according to a sixth embodiment.

FIG. 7 illustrates the configuration of a brake control apparatus 104 according to the sixth embodiment.

The vehicle control apparatus 104 is different from the vehicle control apparatus 102 according to the fourth embodiment in terms of the fact that the second selectors 20 are disposed in the first ECU 5b. A selector switching portion 23 turns on the first selectors 19 and turns off the second selectors 20 when all of the individual functions of the first ECU 5b (the first signal processing portion 13 and the first calculation portion 15) operate normally, and turns off the first selectors 19 and turns on the second selectors 20 when a failure has occurred in any of the functions.

In the vehicle control apparatus 104 according to the sixth embodiment, the first selectors 19 and the second selectors 20 are disposed in the first ECU 5b. Due to this configuration, the ON/OFF of the first selectors 19 and the second selectors 20 can be controlled by the single selector switching portion 23. Due to this configuration, the structure of the second ECU 6b can be simplified.

Figure 8:
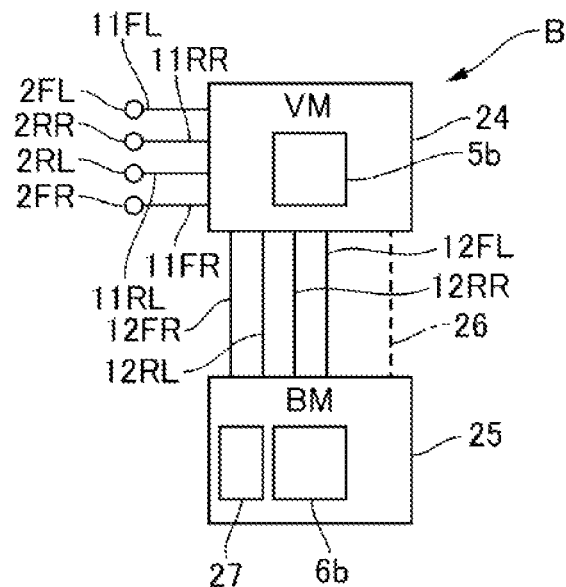
FIG. 8 illustrates the configuration of main portions of a vehicle control system B according to a seventh embodiment.

[Seventh Embodiment] FIG. 8 illustrates the configuration of main portions of a vehicle control system B according to a seventh embodiment.

The vehicle control system B is different from the vehicle control system A according to the first embodiment in terms of the fact that the first ECU 5b is disposed in a vehicle integrated module 24 and the second ECU 6b is disposed in a brake module 25. The vehicle integrated module 24 and the brake module 25 are connected via a CAN signal line 26. The vehicle integrated module 24 controls the running state of the entire vehicle, and the first ECU 5b outputs a braking instruction based on the detection signals of the wheel speed sensors 2 and the like. The second ECU 6b controls the actuation of a hydraulic pressure unit 27 according to the braking instruction.

Figure 9:
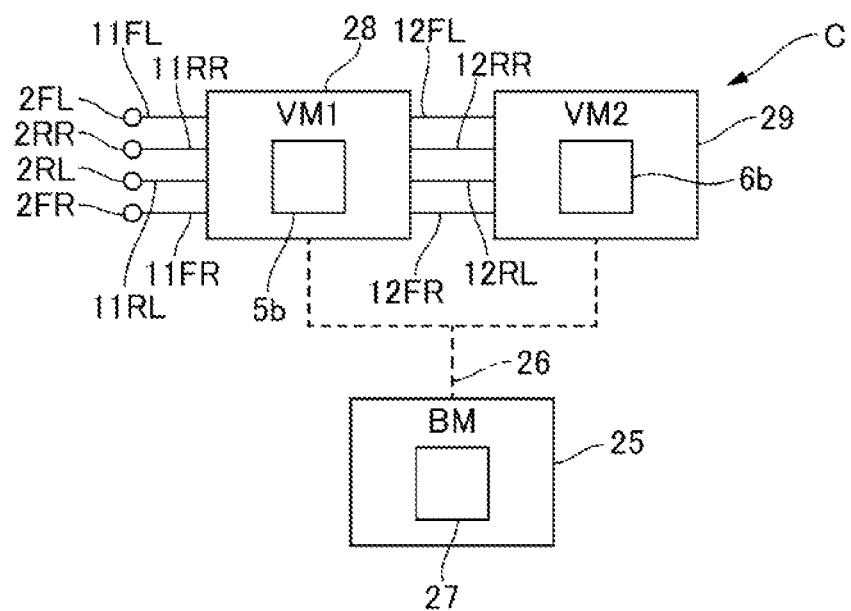
FIG. 9 illustrates the configuration of main portions of a vehicle control system C according to an eighth embodiment.

[Eighth Embodiment] FIG. 9 illustrates the configuration of main portions of a vehicle control system C according to an eighth embodiment.

The vehicle control system C is established by modifying the vehicle control system B according to the seventh embodiment so as to provide a redundant arrangement for the vehicle integrated module. The first ECU 5b is disposed in a first vehicle integrated module 28, and the second ECU 6b is disposed in a second vehicle integrated module 29. The second ECU 6b outputs the braking instruction based on the detection signals of the wheel speed sensors 2 and the like when a failure has occurred in the first ECU 5b.

Figure 10:
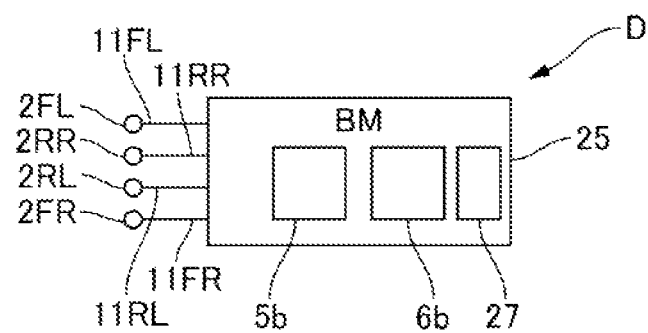
FIG. 10 illustrates the configuration of main portions of a vehicle control system D according to a ninth embodiment.

[Ninth Embodiment] FIG. 10 illustrates the configuration of main portions of a vehicle control system D according to a ninth embodiment.

The vehicle control system D is different from the vehicle control system A according to the first embodiment in terms of the fact that the first ECU 5b and the second ECU 6b are disposed in a single brake module 25.

Because the two ECUs 5b and 6b are disposed in the single brake module 25, the safety can be improved with a small cost increase.

Figure 11:
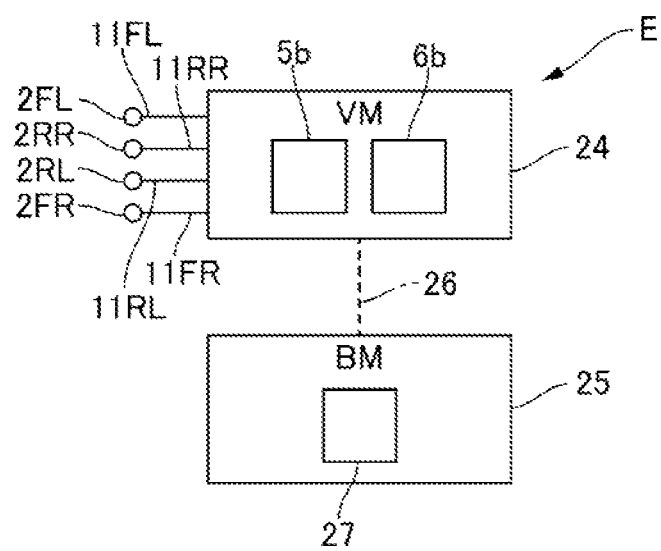
FIG. 11 illustrates the configuration of main portions of a vehicle control system E according to a tenth embodiment.

[Tenth Embodiment] FIG. 11 illustrates the configuration of main portions of a vehicle control system E according to a tenth embodiment.

The vehicle control system E is different from the seventh embodiment in terms of the fact that the first ECU 5b and the second ECU 6b are disposed in the vehicle integrated module 24.

Because the two ECUs 5b and 6b are disposed in the single vehicle integrated module 24, the safety can be improved with a small cost increase.

[Other Embodiments] Having described the embodiments for implementing the present invention, the specific configuration of the present invention is not limited to the configurations of the embodiments, and the present invention also includes even a design modification and the like thereof made within a range that does not depart from the spirit of the present invention, if any.

For example, the first ECU 5b and the second ECU 6b are provided in the ninth embodiment illustrated in FIG. 10 and the tenth embodiment illustrated in FIG. 11, but the function of the first ECU 5b and the function of the second ECU 6b may be independently mounted on one ECU. In other words, this means that the first ECU 5b and the second ECU 6b are not deemed as ECUs but deemed as independent functions.

The wheel speed sensors may be embodied by wheel speed sensors that output a wireless signal in compliance with some communication protocol. Using the wireless signal eliminates the necessity of the wirings.

The redundant arrangement may be provided for only a part of the wheel speed sensors, such as only the wheel speed sensors on the front wheels or the rear wheels.

In the following description, technical ideas recognizable from the above-described embodiments will be described.

A vehicle control apparatus, according to one configuration thereof, includes a first braking instruction portion and a second braking instruction portion. The first braking instruction portion is electrically connected to a wheel speed sensor provided on a wheel. The first braking instruction portion acquires an input signal based on detection by the wheel speed sensor. The first braking instruction portion determines a first braking instruction based on the acquired input signal. The first braking instruction portion outputs the determined first braking instruction to a braking force control portion configured to control a braking force to be generated on the wheel. The second braking instruction portion is electrically connected to the wheel speed sensor. The second braking instruction portion acquires an input signal based on detection by the wheel speed sensor. The second braking instruction portion determines a second braking instruction based on the acquired input signal. The second braking instruction portion outputs the determined second braking instruction to the braking force control portion.

Preferably, in the above-described configuration, the vehicle control apparatus further includes a first module including the first braking instruction portion, and a second module including the second braking instruction portion.

According to another preferable configuration, in any of the above-described configurations, the first braking instruction portion and the second braking instruction portion are each connected to the wheel speed sensor via a wiring.

According to further another preferable configuration, in any of the above-described configurations, the braking force control portion includes a first braking force control portion and a second braking force control portion. The first braking force control portion is disposed in the first module. The second braking force control portion is disposed in the second module.

According to further another preferable configuration, in any of the above-described configurations, the vehicle control apparatus further includes a module including the first braking instruction portion and the second braking instruction portion.

According to further another preferable configuration, in any of the above-described configurations, the vehicle control apparatus further includes a first braking function portion including the first braking instruction portion, and a second braking function portion including the second braking instruction portion. The braking force control portion includes a first braking force control portion and a second braking force control portion. The first braking force control portion is disposed in the first braking function portion. The second braking force control portion is disposed in the second braking function portion.

According to further another preferable configuration, in any of the above-described configurations, the vehicle control apparatus further includes a signal processing portion configured to process a detection signal of the wheel speed sensor. The first braking instruction portion includes a first calculation portion configured to determine the first braking instruction based on the input signal. The second braking instruction portion includes a second calculation portion configured to determine the second braking instruction based on the input signal. The detection signal processed by the signal processing portion is input to each of the first calculation portion and the second calculation portion as the input signal via a branch wiring.

According to further another preferable configuration, in any of the above-described configurations, the signal processing portion includes a first signal processing portion and a second signal processing portion. The first signal processing portion and the second signal processing portion are disposed in the first braking instruction portion. The detection signal processed by the first signal processing portion is input to each of the first calculation portion and the second calculation portion via a first branch wiring. The detection signal processed by the second signal processing portion is input to each of the first calculation portion and the second calculation portion via a second branch wiring.

According to further another preferable configuration, in any of the above-described configurations, the signal processing portion includes a first signal processing portion and a second signal processing portion. The first signal processing portion is disposed in the first braking instruction portion. The second signal processing portion is disposed in the second braking instruction portion. The detection signal processed by the first signal processing portion is input to each of the first calculation portion and the second calculation portion via a first branch wiring. The detection signal processed by the second signal processing portion is input to each of the first calculation portion and the second calculation portion via a second branch wiring.

According to further another preferable configuration, in any of the above-described configurations, the vehicle control apparatus further includes a first signal processing portion configured to process a detection signal of the wheel speed sensor, and a second signal processing portion configured to process the detection signal of the wheel speed sensor. The detection signal of the wheel speed sensor is input to each of the first signal processing portion and the second signal processing portion via a branch wiring.

According to further another preferable configuration, in any of the above-described configurations, the vehicle control apparatus further includes a first selector and a second selector. The first selector is disposed on one side closer to the first signal processing portion with respect to a branch point of the branch wiring. The second selector is disposed on one side closer to the second signal processing portion with respect to the branch point of the branch wiring. The first elector and the second selector selectively switch a connection between the wheel speed sensor and the first signal processing portion or the second signal processing portion.

According to further another preferable configuration, in any of the above-described configurations, the first selector is disposed in the first braking instruction portion. The second selector is disposed in the second braking instruction portion.

According to further another preferable configuration, in any of the above-described configurations, the first selector and the second selector are disposed in the first braking instruction portion.

According to further another preferable configuration, in any of the above-described configurations, the first signal processing portion is disposed in the first braking instruction portion. The second signal processing portion is disposed in the second braking instruction portion.

Further, from another aspect, a vehicle control apparatus, in one configuration thereof, includes a first control portion electrically connected to a wheel speed sensor provided on a wheel and configured to acquire an input signal based on detection by the wheel speed sensor, and a second control portion electrically connected to the wheel speed sensor and configured to acquire an input signal based on detection by the wheel speed sensor.

Preferably, in the above-described configuration, the second control portion has the same function as the first control portion.

Further, from another aspect, a vehicle control system, in one configuration thereof, includes a wheel speed sensor provided on a wheel, a braking force application portion configured to apply a braking force to the wheel, a first braking instruction portion electrically connected to the wheel speed sensor, a second braking instruction portion electrically connected to the wheel speed sensor, and a braking force control portion configured to control the braking force to be generated by a braking force generation portion based on a first braking instruction output from the first braking instruction portion or a second braking instruction output from the second braking instruction portion.

The present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each of the embodiments can also be implemented with another configuration added, deleted, or replaced with respect to a part of the configuration of this embodiment.

The present application claims priority under the Paris Convention to Japanese Patent Application No. 2018-188450 filed on Oct. 3, 2018. The entire disclosure of Japanese Patent Application No. 2018-188450 filed on Oct. 3, 2018 including the specification, the claims, the drawings, and the abstract is incorporated herein by reference in its entirety.

REFERENCE SIGNS LIST 1 vehicle control apparatus
2 wheel speed sensor
3 wheel cylinder (braking force application portion)
5a first hydraulic pressure unit (first braking force control portion)
5b first ECU (first braking instruction portion, first control portion)
6a second hydraulic pressure unit (second braking force control portion)
6b second ECU (second braking instruction portion, second control portion)
A vehicle control system
FL front left wheel
FR front right wheel
RL rear left wheel
RR rear right wheel

The invention claimed is:

1. A vehicle control apparatus comprising:
   a first braking instruction portion; and
   a second braking instruction portion,
   wherein the first braking instruction portion is electrically connected to a wheel speed sensor provided on a wheel via a first wiring, and the first wiring directly connects the first braking instruction portion and the wheel speed sensor,
   wherein the first braking instruction portion acquires a detection signal of the wheel speed sensor as an input signal using the first wiring,
   wherein the first braking instruction portion determines a first braking instruction based on the acquired input signal,
   wherein the first braking instruction portion outputs the determined first braking instruction to a braking force control portion configured to control a braking force to be generated on the wheel,
   wherein the second braking instruction portion is electrically connected to the wheel speed sensor via a second wiring, and the second wiring directly connects the second braking instruction portion and the wheel speed sensor,
   wherein the second braking instruction portion acquires the detection signal of the wheel speed sensor as the input signal using the second wiring,
   wherein the second braking instruction portion determines a second braking instruction based on the acquired input signal, and
   wherein the second braking instruction portion outputs the determined second braking instruction to the braking force control portion.

2. The vehicle control apparatus according to claim 1, further comprising:
   a first module including the first braking instruction portion; and
   a second module including the second braking instruction portion.

3. The vehicle control apparatus according to claim 2, wherein the braking force control portion includes a first braking force control portion and a second braking force control portion,
   wherein the first braking force control portion is disposed in the first module, and
   wherein the second braking force control portion is disposed in the second module.

4. The vehicle control apparatus according to claim 1, further comprising a module including the first braking instruction portion and the second braking instruction portion.

5. The vehicle control apparatus according to claim 1, further comprising:
   a first braking function portion including the first braking instruction portion; and
   a second braking function portion including the second braking instruction portion,
   wherein the braking force control portion includes a first braking force control portion and a second braking force control portion,
   wherein the first braking force control portion is disposed in the first braking function portion, and
   wherein the second braking force control portion is disposed in the second braking function portion.

6. The vehicle control apparatus according to claim 1, further comprising a signal processing portion configured to process the detection signal of the wheel speed sensor,
   wherein the first braking instruction portion includes a first calculation portion configured to determine the first braking instruction based on the input signal,
   wherein the second braking instruction portion includes a second calculation portion configured to determine the second braking instruction based on the input signal, and
   wherein the detection signal processed by the signal processing portion is input to each of the first calculation portion and the second calculation portion via a branch wiring.

7. The vehicle control apparatus according to claim 6, wherein the signal processing portion includes a first signal processing portion and a second signal processing portion,
   wherein the first signal processing portion and the second signal processing portion are disposed in the first braking instruction portion,
   wherein the detection signal processed by the first signal processing portion is input to each of the first calculation portion and the second calculation portion via a first branch wiring, and
   wherein the detection signal processed by the second signal processing portion is input to each of the first calculation portion and the second calculation portion via a second branch wiring.

8. The vehicle control apparatus according to claim 6, wherein the signal processing portion includes a first signal processing portion and a second signal processing portion,
   wherein the first signal processing portion is disposed in the first braking instruction portion,
   wherein the second signal processing portion is disposed in the second braking instruction portion,
   wherein the detection signal processed by the first signal processing portion is input to each of the first calculation portion and the second calculation portion via a first branch wiring, and
   wherein the detection signal processed by the second signal processing portion is input to each of the first calculation portion and the second calculation portion via a second branch wiring.

9. The vehicle control apparatus according to claim 1, further comprising:
   a first signal processing portion configured to process the detection signal of the wheel speed sensor; and
   a second signal processing portion configured to process the detection signal of the wheel speed sensor,
   wherein the detection signal of the wheel speed sensor is input to each of the first signal processing portion and the second signal processing portion via a branch wiring.

10. The vehicle control apparatus according to claim 9, further comprising:
    a first selector; and
    a second selector,
    wherein the first selector is disposed on one side closer to the first signal processing portion with respect to a branch point of the branch wiring,
    wherein the second selector is disposed on one side closer to the second signal processing portion with respect to the branch point of the branch wiring, and
    wherein the first elector and the second selector selectively switch a connection between the wheel speed sensor and the first signal processing portion or the second signal processing portion.

11. The vehicle control apparatus according to claim 10, wherein the first selector is disposed in the first braking instruction portion, and wherein the second selector is disposed in the second braking instruction portion.

12. The vehicle control apparatus according to claim 10, wherein the first selector and the second selector are disposed in the first braking instruction portion.

13. The vehicle control apparatus according to claim 10, wherein the first signal processing portion is disposed in the first braking instruction portion, and
wherein the second signal processing portion is disposed in the second braking instruction portion.

14. A vehicle control apparatus comprising:
a first control portion electrically connected to a wheel speed sensor provided on a wheel via a first wiring and configured to acquire a detection signal of the wheel speed sensor as an input signal using the first wiring, wherein the first wiring directly connects the first braking instruction portion and the wheel speed sensor; and
a second control portion electrically connected to the wheel speed sensor via a second wiring and configured to acquire the detection signal of the wheel speed sensor as the input signal using the second wiring, wherein the second wiring directly connects the second braking instruction portion and the wheel speed sensor.

15. The vehicle control apparatus according to claim 14, wherein the second control portion has the same function as the first control portion.

16. A vehicle control system comprising:
a wheel speed sensor provided on a wheel;
a braking force application portion configured to apply a braking force to the wheel;
a first braking instruction portion electrically connected to the wheel speed sensor via a first wiring and configured to acquire an detection signal of the wheel speed sensor as an input signal using the first wiring, wherein the first wiring directly connects the first braking instruction portion and the wheel speed sensor;
a second braking instruction portion electrically connected to the wheel speed sensor via a second wiring and configured to acquire the detection signal of the wheel speed sensor as the input signal using the second wiring, wherein the second wiring directly connects the second braking instruction portion and the wheel speed sensor; and
a braking force control portion configured to control the braking force to be generated by a braking force generation portion based on a first braking instruction output from the first braking instruction portion or a second braking instruction output from the second braking instruction portion.

* * * * *